United States Patent Office 3,660,473
Patented May 2, 1972

---

3,660,473
PREPARATION OF TRI- AND TETRAHALO-SUBSTITUTED AROMATIC COMPOUNDS
Louis Schmerling, Riverside, Ill., assignor to Universal Oil Products Company, Des Plaines, Ill.
No Drawing. Filed Apr. 28, 1969, Ser. No. 819,933
Int. Cl. C07c 63/10
U.S. Cl. 260—515 A
10 Claims

ABSTRACT OF THE DISCLOSURE

Tri- and tetrahalo-substituted aromatic compounds are prepared by reacting a pentahalo-2,4-pentadienoic acid with an olefinic hydrocarbon at elevated temperatures and pressures to produce the desired compound. The trihalo-substituted aromatic compounds are exemplified by 1,2,3-trichlorobenzene and 2,3,4-trichlorobenzoic acid.

---

This invention relates to a process for the preparation of tri- and tetrahalo-substituted aromatic compounds. More particularly, the invention is concerned with the reaction of a pentahalo-2,4-pentadienoic acid with an aliphatic olefinic compound to prepare tri- and tetrahalo-substituted aromatic compounds. For the purposes of this application, the pentahalo-2,4-pentadienoic acids will be referred to merely as pentahalopentadienoic acids.

It has now been discovered that when pentahalopentadienoic acids are reacted with an olefinic compound a ring closure is effected and a tri- or tetrahalo-substituted compound is obtained thereby, the reaction resulting in the loss of carbon dioxide and hydrogen halide. Heretofore, it has been known that the reaction of perchlorocoumalin with olefins (for example, ethylene) yields 1,2,3,4-tetrachloro-1,3-cyclohexadienes (for example, I) and 1,2,3,4-tetrachlorobicyclo[2.2.2]-2-octenes (for example, II).

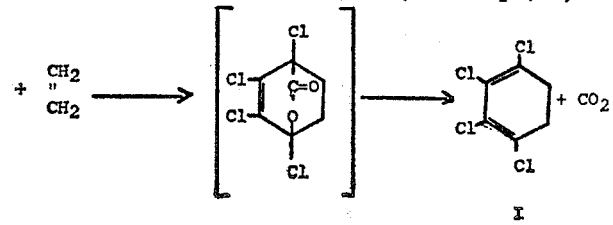

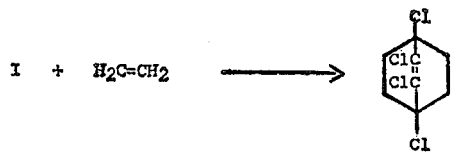
II

It was also known that perchlorocoumalin may be prepared by the reaction of pentachloro-1,3-pentadienoic acid at 150–180° C.

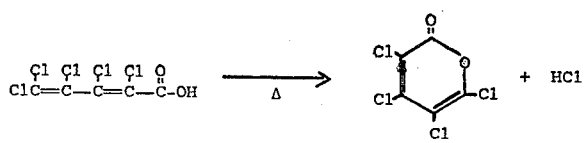

It was therefore very unexpected to discover, as hereinbefore set forth, that the reaction of pentachloro-1,3-pentadienoic acid (in contrast to that of perchlorocoumalin) with alkenes (ethylene in the following equations) yields tri- and tetrachlorobenzenes and trichlorobenzoic acid as reaction products. The reaction apparently involves the following steps:

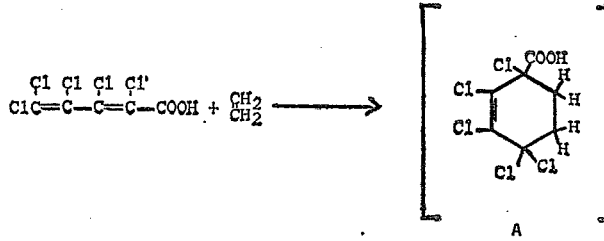
A

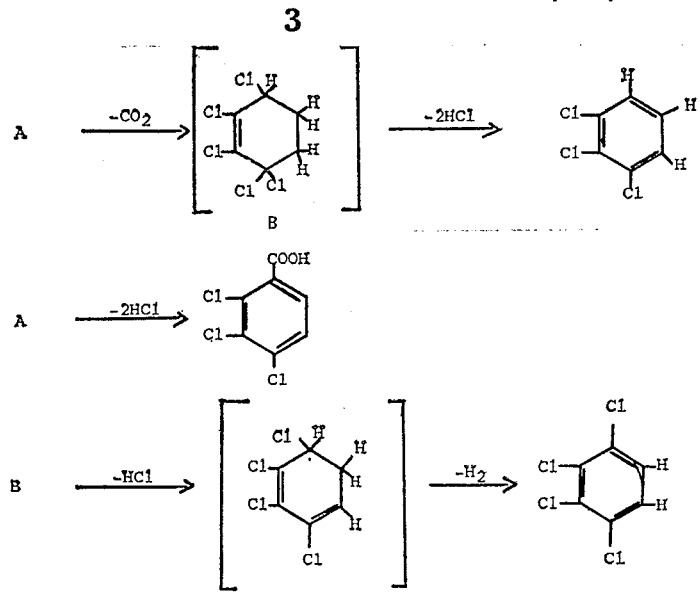

These products comprise tri- and tetrahalo-substituted aromatic compounds (hydrocarbons and benzoic acids) in which the halogen atoms are substituted on the aromatic ring rather than halo-substituted cyclohexadienes in which the halogen atoms are positioned on the dienic ring or halo-substituted bicycloalkenes in which the halogen atoms are positioned on bridge carbon atoms.

The halo-substituted aromatic compounds which are prepared according to the process of this invention will find a wide variety of usage in the chemical field, said compounds being used, for example, as intermediates in the preparation of flame-retardant compounds, said use being by virtue of the halogen atoms on the ring. In addition, the compounds may also be useful as insecticides or as an intermediate in the preparation of other insecticidal compounds. Yet another use for compounds of this type is as an intermediate in the preparation of pharmaceutical preparations.

It is therefore an object of this invention to provide a process for the preparation of an aromatic compound containing three or four vicinal halogen atoms.

A further object of this invention is to provide a process for preparing tri- and tetrahalo-substituted aromatic compounds utilizing a pentahalopentadienoic acid and an olefinic hydrocarbon as the starting materials.

In one aspect an embodiment of this invention resides in a process for the preparation of tri- and tetrahalo-substituted aromatic compounds which comprises reacting a pentahalopentadienoic acid with an alkene characterized by the presence of at least one hydrogen atom on each of the doubly bonded carbon atoms at reaction conditions which include an elevated temperature and elevated pressure, and recovering the resultant trihalo-substituted aromatic compound.

A specific embodiment of this invention is found in a process for the preparation of a trihalo-substituted aromatic compound which comprises reacting pentachloropentadienoic acid with ethylene at a temperature in the range of from about 175° C. to about 250° C. and a pressure in the range of from about 1 to about 100 atmospheres, and recovering the resultant 1,2,3-trichlorobenzene and 2,3,4-trichlorobenzoic acid.

Other objects and embodiments will be found in the following further detailed description of the present invention.

As hereinbefore set forth, the present invention is concerned with a process for the preparation of tri- and tetrahalo-substituted aromatic compounds in which each of the halogen substituents is on separate and adjacent carbon atoms. The preferred halogen in the tri- or tetrahalo-substituted aromatic compound comprises chlorine or bromine. The desired product is obtained by reacting a pentahalopentadienoic acid with an olefinic hydrocarbon at an elevated temperature and pressure. Heretofore, trihalobenzenes of this type were prepared by replacing the amino group of a vicinal dihaloaniline or a trihaloaniline by a halogen or hydrogen utilizing a diazotization reaction.

In the process of this invention the pentahalopentadienoic acid, the preferred acids being pentachloropentadienoic or pentabromopentadienoic acid, are reacted with an olefinic hydrocarbon at a temperature in the range of from about 175° to about 275° C. and preferably in a range of from about 200° C. to about 250° C. Examples of olefinic hydrocarbons which are reacted with the acid comprise straight-chain alkenes containing from 2 up to about 20 carbon atoms and which are characterized by containing at least one hydrogen atom on each of the doubly bonded carbon atoms. Specific examples of these compounds will include alkenes such as ethylene, propylene, 1-butene, 2-butene, 1-pentene, 2-pentene, 1-hexene, 2-hexene, 3-hexene, 1-heptene, 2-heptene, 3-heptene, the isomeric octenes, nonenes, decenes, undecenes, dodecenes, tridecenes, tetradecenes, pentadecenes, hexadecenes, heptadecenes, octadecenes, nonadecenes, eicosenes, etc.; branched-chain alkenes such as 3-methyl-1-butene may also be used, it being essential that the olefin contain at least one hydrogen atom on each of the doubly bonded carbon atoms. The olefinic hydrocarbon of the type hereinbefore set forth in greater detail is present in a mole ratio of from about 0.5:1 to about 5:1 moles of olefin per mole of pentahalo-substituted pentadienoic acid.

The process of this invention may be effected in any suitable manner and may comprise either a batch or continuous type operation. For example, when a batch type operation is used, a quantity of the pentahalopentadienoic acid is placed in an appropriate apparatus, such as, an autoclave of the rotating or stirring type. The alkene of the type hereinbefore set forth is then added to the autoclave in either gaseous or liquid form. If the olefinic hydrocarbon is in gaseous form, the autoclave is sealed prior to admittance of the olefin thereto. The amount of olefin which is charged to the autoclave will be that which is sufficient to maintain the proper operating pressure of the reaction. Alternatively speaking, if the olefin is in liquid form, the autoclave is sealed after the said olefin is charged thereto and a substantially inert gas such as nitrogen is charged thereto until the proper operating pressure has been reached. It is also contemplated within the scope of this invention that the reaction may be effected at atmospheric pressure; however, in the preferred embodiment, superatmospheric pressures, whether provided for by the autogenous pressure of the gaseous olefin or by superimposed pressures effected by the introduction of an inert gas, are used. The apparatus and contents thereof are then heated to the desired operating temperature and maintained thereat for a predetermined period of time which may range from about 0.5 up to about 10 hours or more, said operating temperatures being in a range of from about 175° to about 275° C. and preferably in a range of from about 200° to about 250° C. Upon completion of the desired residence time, which may range from about 0.5 to about 10 hours or more, heating is discontinued, the apparatus is allowed to return to room temperature and the excess pressure is vented. The reaction product is recovered from the apparatus, the solid material is separated from the liquid and extracted with an alkali such as aqueous sodium hydroxide, potassium hydroxide, etc. The alkali-insoluble material is separated (by ether extraction, for example) and the aqueous alkaline solution is then acidified with an acid such as hydrochloric acid, etc. The precipitate which forms upon the acidification comprises the acid form of the trihalo-substituted aromatic compound. The alkali-insoluble portion of the reaction product is then subjected to conventional separation means such as fractional distillation under reduced pressure whereby the desired product, comprising the tri- and tetrahalo-substituted aromatic compounds, are separated and recovered.

It is also contemplated within the scope of this invention that the process for preparing the halo-substituted aromatic compound may be effected in a continual manner of operation. When such a type of operation is used, the starting materials comprising the pentahalo-substituted pentadienoic acid and the olefin, whether in gaseous or liquid form, are continuously charged to a reactor which is maintained at the proper operating conditions of temperature and pressure. After completing a predetermined residence in the reactor, the effluent is continuously withdrawn and subjected to a separation step by any means known in the art whereby the product is separated from the unreacted starting materials, the latter being recycled to form a portion of the feed stock. The reaction product is treated in a manner similar to that set forth in the above paragraph whereby the desired product comprising the tri- and tetrahalo-substituted aromatic compound is separated and recovered.

Examples of trihalo-substituted aromatic compounds which may be prepared according to the process hereinbefore set forth will include 1,2,3-trichlorobenzene,
1,2,3-tribromobenzene,
2,3,4-trichlorotoluene,
2,3,4-tribromotoluene,
2,3,4-trichloroethylbenzene,
2,3,4-tribromoethylbenzene,
2,3,4-trichloropropylbenzene,
2,3,4-tribromopropylbenzene,
2,3,4-trichlorobutylbenzene,
2,3,4-tribromobutylbenzene,
2,3,4-trichloropentylbenzene,
2,3,4-tribromopentylbenzene, etc.

Examples of trihalobenzoic acids will include 2,3,4-trichlorobenzoic acid,
2,3,4-tribromobenzoic acid,
2,3,5-trichlorobenzoic acid,
2,3,5-tribromobenzoic acid,
2,4,6-trichlorobenzoic acid,
2,4,6-tribromobenzoic acid, etc.

Examples of tetrahalo-substituted aromatic compounds will include 1,2,3,4-tetrachlorobenzene,
1,2,3,4-tetrabromobenzene,
1,2,3,5-tetrachlorobenzene,
1,2,3,5-tetrabromobenzene,
2,3,4,5-tetrachlorotoluene,
2,3,4,5-tetrabromotoluene,
2,3,4,5-tetrachlorobenzoic acid,
2,3,4,5-tetrabromobenzoic acid,
2,3,5,6-tetrachlorobenzoic acid,
2,3,5,6-tetrabromobenzoic acid, etc.

It is to be understood that the aforementioned compounds are only representative of the class of compounds which may be prepared according to the process of this invention and that the present invention is not necessarily limited thereto. It is also contemplated that compounds including mixed halogens (even some fluorine or iodine) are included herewith.

The following examples are given to illustrate the process of the present invention which, however, are not intended to limit the generally broad scope of the present invention in strict accordance therewith.

EXAMPLE I

In this example 51 grams (0.19 mole) of pentachloropentadienoic acid was placed in the glass liner of a rotating autoclave having a capacity of 50 cc. The autoclave was sealed and ethylene was pressed in until an initial pressure of 50 atmospheres was reached, the autoclave then being heated to a temperature of about 250° C. during a period of 5 hours. At the end of this time, the autoclave and contents thereof were allowed to cool to room temperature, the excess pressure was vented and the reaction product was recovered. The product which consisted of a dark liquid and solid was shaken with pentane, and the pentane solution was filtered. The solid which remained was extracted with aqueous sodium hydroxide, the resulting solution was filtered to remove material which was not alkali-soluble, and the filtrate was then acidified with a hydrochloric acid; there was obtained a white powder melting at 188° C. which was shown by Nuclear Magnetic Resonance to be 2,3,4-trichlorobenzoic acid which is reported to melt at 186°–187° C. The pentane solution of the product was subjected to fractional distillation under reduced pressure, the cut which boiled at 80° C. at 9 mm. pressure was recovered and allowed to crystallize upon reaching room temperature. The product which comprised 1,2,3-trichlorobenzene had a melting point of 53–54° C. which corresponds to the melting point cited in the literature for 1,2,3-trichlorobenzene.

EXAMPLE II

A glass liner containing 13 grams (0.05 mole) of pentachloropentadienoic acid was sealed into a rotating autoclave and ethylene was pressed in until the pressure was 30 atmospheres. The autoclave was then heated at 175 to 250° C. during 4 hours, after which it was cooled to room temperature, the excess pressure was vented and the reaction product was recovered. Preparative Gas Liquid Chromatography yielded two fractions which were shown by means of Infrared, Nuclear Magnetic Resonance, and analysis for carbon and hydrogen content to be 1,2,3-trichlorobenzene and 1,2,3,4-tetrachlorobenzene.

EXAMPLE III

To the glass liner of a rotating autoclave was added 14 grams (0.05 mole) of pentachloropentadienoic acid dissolved in 47 g. toluene. The liner was sealed into the autoclave and 25 grams (0.6 mole) propylene was pressed in, followed by nitrogen which was added until an initial pressure of 50 atmospheres was reached. Following this, the autoclave was heated at 165° to 200° C. for a period of 2 hours. At the end of this time, the autoclave and contents thereof were allowed to return to room temperature, the excess temperature was vented, and the reaction product was recovered from the autoclave. The clear amber toluene solution was decanted from a small amount (less than one g.) of crystalline product and was extracted with aqueous sodium hydroxide. Acidification of the alkaline solution yielded a turbid product which was not further treated. The toluene solution was concentrated by evaporation of most of the toluene and the residue was analyzed by means of Preparative Gas Liquid Chromatography combined with Nuclear Magnetic Resonance and Infrared. 2,3,4,5-tetrachlorotoluene was shown to be a product of the reaction.

EXAMPLE IV

In this example 49 grams (0.1 mole) of pentabromopentadienoic acid is placed in the glass liner of a rotating autoclave which is thereafter sealed. Ethylene is pressed in until an initial pressure of 50 atmospheres is reached, following which the autoclave and contents thereof are heated to a temperature of about 200° C. The autoclave is maintained at a temperature in the range of from about 200° to about 250° C. for a period of about 4 hours, at the end of which time, heating is discontinued and the apparatus allowed to return to room temperature. The excess pressure is vented and the reaction product is recovered from the autoclave. The product is separated into pentane-soluble and pentane-insoluble portions and the latter is extracted with aqueous sodium hydroxide and filtered to remove alkali-insoluble material. Acidification of the filtrate with hydrochloric acid will precipitate out a solid comprising 2,3,4-tribromobenzoic acid. The pentane-soluble portion of the product is subjected to fractional distillation under reduced pressure, the desired cut comprising 1,2,3-tribromobenzene being separated out and recovered.

I claim as my invention:

1. A process for the preparation of a trihalo-substituted aromatic compound which comprises reacting a pentahalopentadienoic acid with an alkene characterized by the presence of at least one hydrogen atom on each of the doubly-bonded carbon atoms at a temperature of about 175° C. to about 250° C. and a pressure of about 1 to about 100 atmospheres, and recovering the resultant trihalo-substituted aromatic compound.

2. The process as set forth in claim 1 in which said pentahalopentadienoic acid is pentachloropentadienoic acid.

3. The process as set forth in claim 1 in which said pentahalopentadienoic acid is pentabromopentadienoic acid.

4. The process as set forth in claim 1 in which said alkene is ethylene.

5. The process as set forth in claim 1 in which said alkene is propylene.

6. The process as set forth in claim 1 in which said alkene is 1- or 2-butene.

7. The process as set forth in claim 1 in which said trihalo-substituted aromatic compound is 1,2,3-trichlorobenzene.

8. The process as set forth in claim 1 in which said trihalo-substituted aromatic compound is 1,2,3,4-tetrachlorobenzene.

9. The process as set forth in claim 1 in which said trihalo-substituted aromatic compound is 2,3,4-trichlorobenzoic acid.

10. The process as set forth in claim 1 in which said trihalo-substituted aromatic compound is 2,3,4-trichlorotoluene.

References Cited

UNITED STATES PATENTS 3,092,641   6/1963   Leon _____ 260—343.2

JAMES A. PATTEN, Primary Examiner

U.S. Cl. X.R.

260—650 A, 650 R